US008881371B2

(12) United States Patent
Guercioni (10) Patent No.: US 8,881,371 B2
(45) Date of Patent: Nov. 11, 2014

(54) METHOD AND APPARATUS FOR TWISTING BAR CONDUCTORS, IN PARTICULAR FOR BAR WINDINGS OF ELECTRIC MACHINES

(75) Inventor: Sante Guercioni, Teramo (IT)

(73) Assignee: Tecnomatic S.p.A., Teramo (IT)

( * ) Notice: Subject to any disclaimer, the term of this patent is extended or adjusted under 35 U.S.C. 154(b) by 1 day.

(21) Appl. No.: 13/387,728

(22) PCT Filed: Jul. 8, 2010

(86) PCT No.: PCT/IT2010/000305
§ 371 (c)(1),
(2), (4) Date: Jan. 28, 2012

(87) PCT Pub. No.: WO2012/004817
PCT Pub. Date: Jan. 12, 2012

(65) Prior Publication Data
US 2014/0015366 A1 Jan. 16, 2014

(51) Int. Cl.
H02K 15/04 (2006.01)
H02K 3/28 (2006.01)
H02K 3/12 (2006.01)

(52) U.S. Cl.
CPC .............. H02K 15/0428 (2013.01); H02K 3/28 (2013.01); H02K 3/12 (2013.01)
USPC ................................ 29/596; 29/736; 310/201

(58) Field of Classification Search
CPC .................................................. H02K 15/0428
USPC ..................................... 29/596, 736; 310/201
See application file for complete search history.

(56) References Cited

U.S. PATENT DOCUMENTS

| 6,894,417 B2* | 5/2005 | Cai et al. ........................ 310/198 |
| 7,480,987 B1 | 1/2009 | Guercioni |
| 7,721,413 B2 | 5/2010 | Guercioni |
| 2001/0007169 A1* | 7/2001 | Takahashi et al. .............. 29/596 |
| 2003/0121139 A1* | 7/2003 | Katou et al. .................... 29/596 |
| 2009/0178270 A1 | 7/2009 | Guercioni |

FOREIGN PATENT DOCUMENTS

| EP | 1248350 | 10/2002 |
| EP | 1324470 | 7/2003 |
| WO | 2011128919 | 10/2011 |
| WO | 2011132207 | 10/2011 |
| WO | 2011135596 | 11/2011 |

* cited by examiner

Primary Examiner — Livius R Cazan
(74) Attorney, Agent, or Firm — Tarter Krinsky & Drogin LLP (57) ABSTRACT

A method for twisting preformed bar conductors of electric machines comprising:
a) providing a twisting apparatus comprising a twisting device having at least a first and a second body extended around a twisting axis, respectively comprising a first and a second circular array of pockets with center on such axis, said bodies being relatively rotatable to each other around the twisting axis to assume a first insertion configuration in which respective pockets of the first and second array are radially aligned;
loading, in a subset of said pockets, a first plurality of said preformed conductors leaving a first residual subset of pockets free;
driving the first and the second body in relative rotation around said axis until a second insertion configuration is reached in which a second plurality of pockets of the first and second body of said residual subset are radially aligned with each other.

9 Claims, 13 Drawing Sheets

FIG. 20

METHOD AND APPARATUS FOR TWISTING BAR CONDUCTORS, IN PARTICULAR FOR BAR WINDINGS OF ELECTRIC MACHINES

CROSS REFERENCE TO RELATED APPLICATIONS

This application is based on International Application No. PCT/IT2010/000305, filed on Jul. 8, 2010, the contents of which are incorporated herein by reference.

TECHNICAL FIELD

The present disclosure regards a method for twisting bar conductors, in particular for bar windings of electrical machines, and the related twisting apparatus.

BACKGROUND

Components of electrical machines are known, such as stators and rotors, which comprise bar conductors that are bent and connected together in different ways so as to make so-called bar windings.

In particular, belonging to the state of the art are bar windings made by means of bar conductors having a essentially "rectangular" cross section, where by "rectangular" it is intended both the square section and the "flat" section with which a section of rectangular shape is generally indicated. In such "flat" section, one of the two sides has lower size with respect to the other.

The aforesaid bar conductors are usually preformed by means of 'U'-shaped or 'P'-shaped bends, starting from straight bar conductors. The U.S. Pat. No. 7,480,987 describes a preforming method embodiment of bar conductors (in such document termed "hairpin conductors"). The preforming is such to modify the form of the straight conductors in a manner such that they can be suitably inserted in suitable radially aligned pockets made in a twisting device adapted to deform, after the insertion, the aforesaid preformed conductors. In practice, the twisting device essentially serves for "spreading" the legs of "U"-shaped or "P"-shaped form in order to ensure that two legs of a same conductor, after having extracted the latter from the twisting device, can be subsequently inserted in the slots of a stator or rotor core, radially offset from each other by a predefined pitch.

The United States patent application published with number US 2009/0178270 describes a method for twisting, with uniform pitch, preformed bar conductors after the insertion of the latter in the pockets of the twisting device.

The aforesaid twisting method makes relatively complex the following steps:
the bending operation of the free end portions of the bar conductors (also called twisting from the welding side), after the insertion of such conductors in the slots of a stator core, and
the subsequent operation of welding together such bent, free end portions.

There is therefore the need to provide an alternative twisting method to that described above, which simplifies the aforesaid operations of bending and welding of the free end portions of the bar conductors.

The object of the present disclosure is to provide a method that is such to meet the need described above with reference to the prior art.

DETAILED DESCRIPTION

Further characteristics and advantages of the present invention will be more comprehensible from the description reported hereinbelow of preferred and non-limiting embodiments thereof, in which.

In the figures, equivalent or similar elements are indicated with the same reference numbers.

For the purposes of the present description, by "flat" or "square" bar conductor it is intended a bar conductor having four substantially flat sides, each joined to adjacent sides, typically by a rounded corner.

Therefore, the words "flat" or "square" or equivalent words used for describing the cross section of a bar conductor are used in a general sense and must not be interpreted to exclude the fact that such bar conductors have significantly rounded corners which join the substantially flat sides. The expression "flat conductor" should be intended in the sense that the conductor has two opposite sides whose distance is greater than the distance between the remaining two opposite sides. For the purposes of the present invention, the expression "rectangular conductor" should be intended as a generalization of a flat conductor and square conductor, the square being a special rectangular conductor case in which the four sides have the same size.

Figure 1:
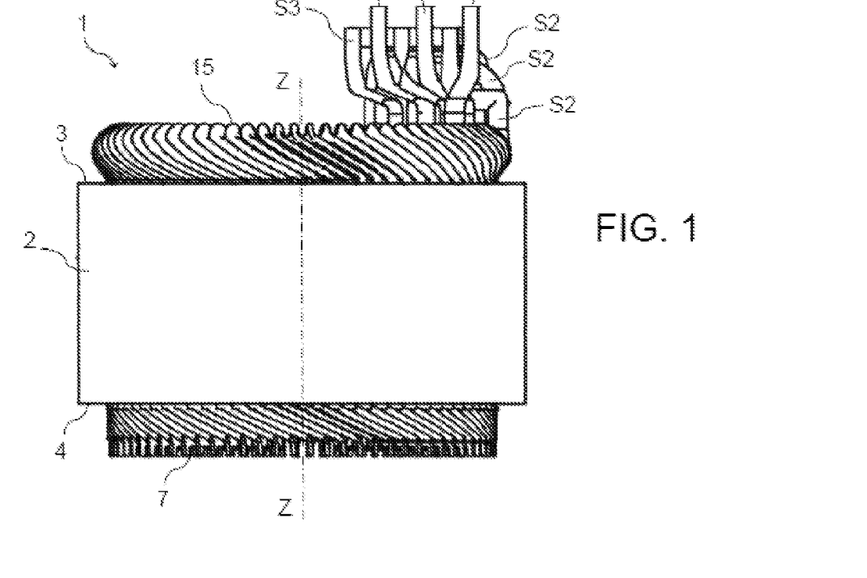
FIG. 1 schematically shows a side view of a stator embodiment for an electric machine, comprising a stator core and a bar stator winding.

With reference to the attached figures, with 1 a stator is indicated in its entirety comprising a stator core 2. For example, the stator 1 is the stator of an electric motor, e.g. for an electric or hybrid drive vehicle.

It is clear that such stator can also be used in an electric machine employed as a generator or used for alternately performing motor function and generator function. In the enclosed figures, only the stator of such electric machine was represented, since it is deemed that the remaining parts of an electric machine or generally of an electric or hybrid drive vehicle are widely known to a man skilled in the art.

For the sake of simplicity and economy of description, a rotor will not be described in detail in this venue since it is deemed that a man skilled in the art, to whom rotor structure is well known, will be able to easily apply the teachings of the present description to a rotor.

In a per se known manner, the stator core 2 comprises a main, laminated tubular body, for example made of magnetic material, which is axially extended (Z-Z axis) between two opposite faces 3,4, respectively known as the insertion face 3 and the welding face 4.

The main body of the stator core 2 comprises a plurality of slots 8 which are axially extended in the thickness of the main body and which are crossed by bar conductors, S1, S2, S3 which overall form at least one stator bar winding. In accordance with one embodiment, the bar conductors U1, U2, S1, S2, S3 are covered on their surface by an insulation layer of electrically insulating material, such as an insulating enamel.

In accordance with one embodiment, the aforesaid bar conductors U1, U2, S1, S2, S3 are made of copper and are flat rectangular conductors, since they have a pair of opposite faces which are further away from each other than the distance between the two remaining opposite faces.

In accordance with one embodiment, the bar conductors U1, U2, S1, S2, S3 comprise a first plurality of basic conductors U1, U2 (also called "hairpin conductors"), and a second plurality of special conductors S1-S3 which for example comprise terminals S1, jumpers S2 or the neutral conductor S3. As is known, the latter bar conductors S1-S3 represent so-called special elements for the completion of the winding. In the present description, the expression "basic conductors" is exclusively used for identifying conductors that are not special elements of the abovementioned type, i.e. that are not specifically provided for the functional completion of the winding.

Figure 2:
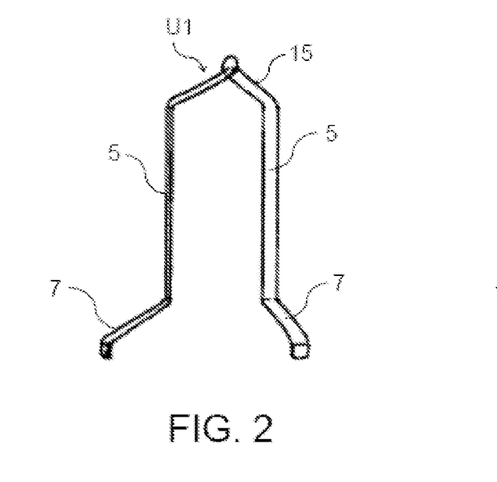
FIG. 2 shows a perspective view of a first basic conductor type.
Figure 3:
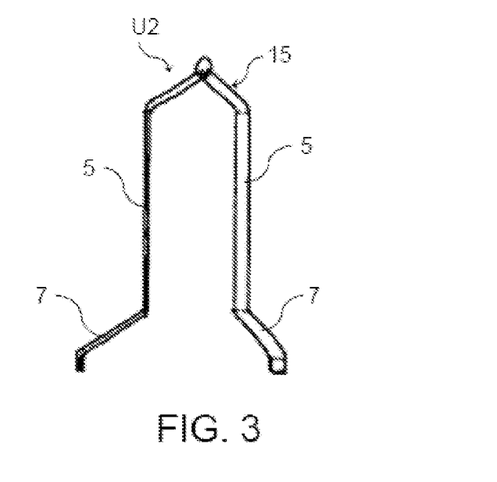
FIG. 3 shows a perspective view of a second basic conductor type.

The basic bar conductors U1, U2 of the first plurality have a bent portion 15, or connection portion, which projects from the insertion face 3 of the stator core 2 and two legs 5 whose free end portions 7 project from the other face 4 of the stator core 2, i.e. from the welding face 4. The bent portion is also often called "head portion" in the field. Among these basic conductors, there is a first conductor type U1 and a second conductor type U2 which mainly differ from each other for the distance between the legs 5. As is known to a man skilled in the art, this difference also involves a certain difference in the overall conductor length.

Figure 9:
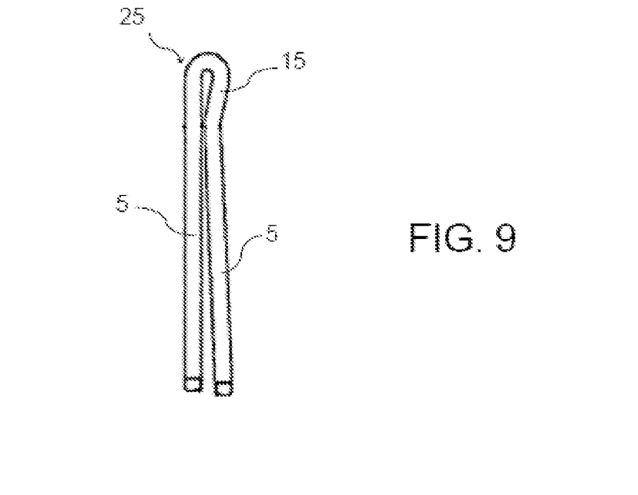
FIG. 9 represents a "P"-shaped preformed bar conductor.

The basic bar conductors U1, U2 are obtained by spreading the legs 5 of a preformed "U"- or "P"-shaped bar conductor 25 as is shown for example in FIG. 9, by a pre-established amount or pitch. From hereon, for the sake of description simplicity and without introducing any limitation, the U- or P-shaped preformed bar conductors will be generally indicated as "U-shaped preformed conductors", intended the U as an approximation of the P of FIG. 9.

The spreading operation of the legs of the U-shaped preformed conductors is generally known as twisting, and more precisely as twisting of the "head portions", and the pre-established amount or pitch is known as "twisting pitch". The latter is measured in number of slots 8. For example, the basic bar conductors of the first type U1 are obtained via twisting of the U-shaped preformed conductor of type equivalent or similar to that represented in FIG. 9 according to a twisting pitch equal to nine slots, while the basic bar conductors of the second type U2 are obtained via twisting of the "U"-shaped preformed conductor of type equal or similar to that represented in FIG. 9 according to a twisting pitch equal to eight slots. It is clear that the aforesaid twisting operation for the spreading of the legs 5 of a same "U"-shaped preformed conductor requires—after having inserted said preformed conductors 25 subjected to twisting in the stator core—the next step of bending the end portions 7 in order to allow the welding of such portions necessary for making the winding. It is also clear that in order to ensure that the basic conductors U1, U2 have, after the twisting, connection portions 15 arranged at a same elevation, said basic conductors must be obtained from "U"-shaped preformed conductors of different length.

Figure 4:
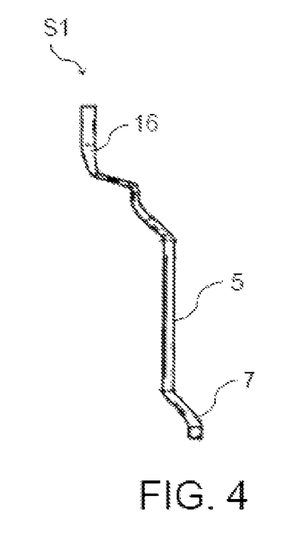
FIG. 4 shows a perspective view of a bar conductor adapted to perform the function of phase terminal.
Figure 5:
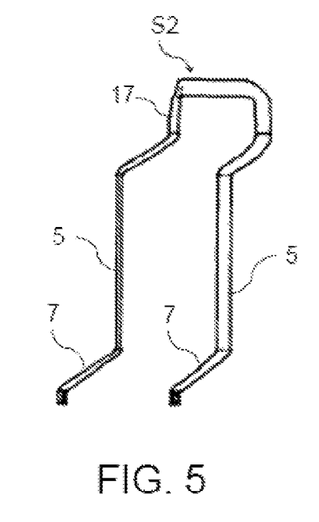
FIG. 5 shows a perspective view of a bar conductor adapted to perform the function of jumper.
Figure 6:
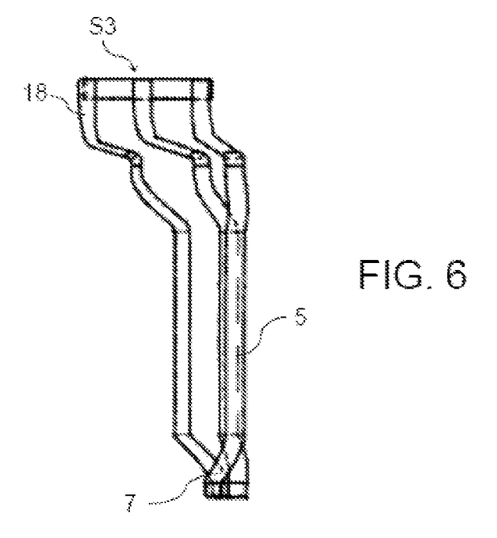
FIG. 6 shows a perspective view of a bar conductor adapted to perform the function of a neutral conductor or star center.

Also the special conductors S1-S3 comprise at least one leg 5, one bent end portion 7 projecting from the welding face 4 and opposite, variously-shaped end portions 16, 17, 18 projecting from the insertion face 3.

Figure 7:
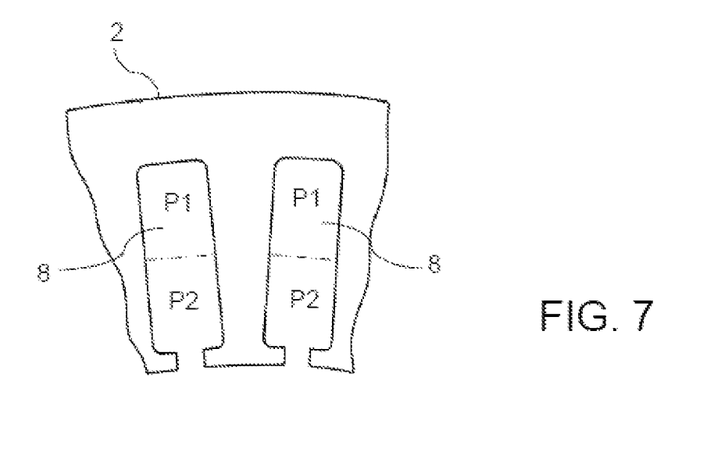
FIG. 7 schematically shows a top view of a portion of the stator core, in which two slots are visible which are intended to be filled with preformed insulating sheets and bar conductors.
Figure 8:
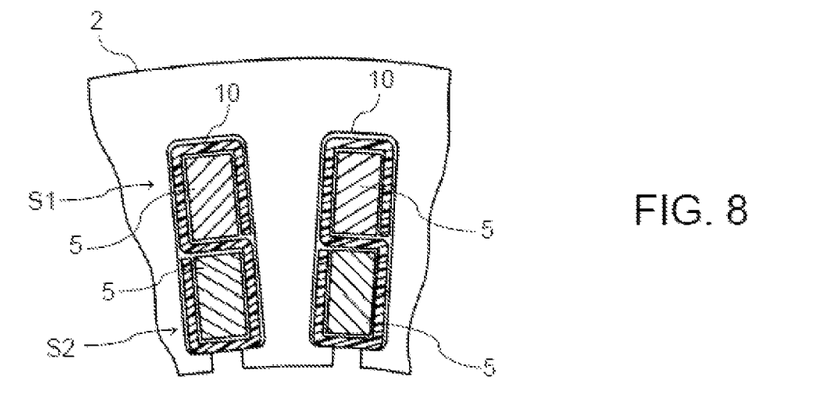
FIG. 8 schematically shows a top view of a portion of the stator core, in which two slots filled with insulating sheets and bar conductors are visible.

With reference to FIGS. 7 and 8, each slot 8 of the stator core 2 is crossed by at least two of the aforesaid bar conductors U1, U2, S1, S2, S3, and in particular by the legs 5 thereof, and houses a sheet 10, or case 10, made of insulating material.

In accordance with a non-limiting embodiment, as shown in FIG. 3, in the case in which the bar conductors are flat, the two bar conductors inside a same slot are aligned along a respective short side thereof.

It is observed that in the particular represented embodiment, each slot 8 has a first and a second insertion position P1, P2 radially aligned with respect to each other. When the legs 5 of the bar conductors U1, U2, S1, S2, S3 are inserted inside the slots 8, two circular and concentric arrays A1, A2 of legs 5 are therefore defined in the stator 1. Clearly, in the case in which each slot 8 has four insertion positions, four circular and concentric arrays of legs 5 will be defined, and so forth.

Figure 10:
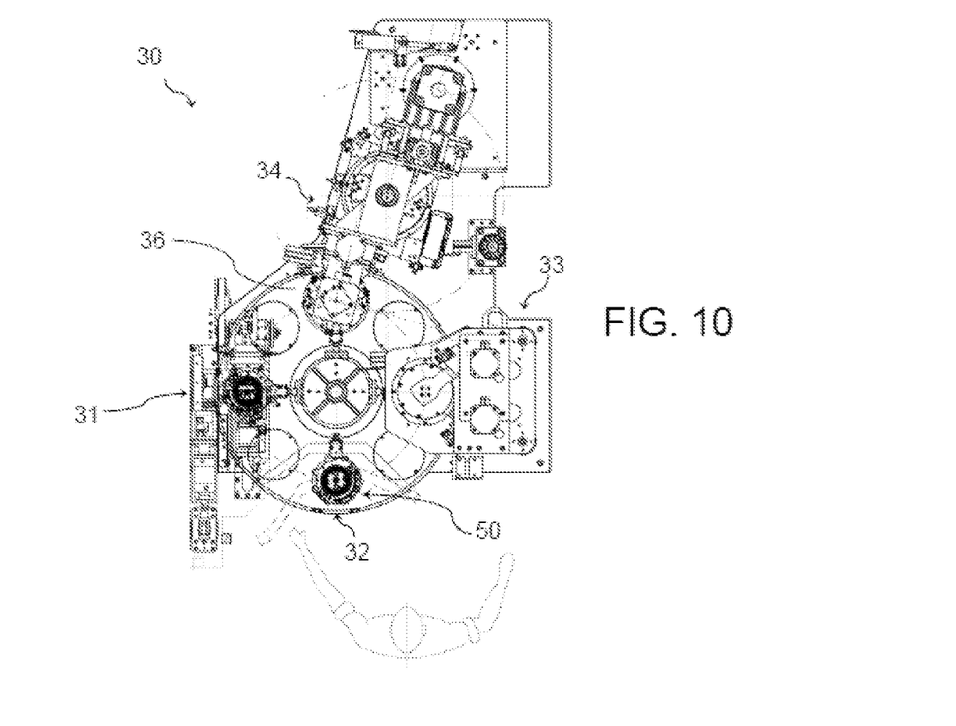
FIG. 10 shows a top view of a twisting apparatus.

In FIG. 10, a twisting apparatus embodiment 30 is shown, comprising a rotating table 36 adapted to move a twisting device 50 between different work stations 31-33, and particularly between a loading station 31 of basic preformed conductors, a subsequent loading station 32 of the special conductors 32, and a twisting station 33 and an extraction station 34.

Figure 11:
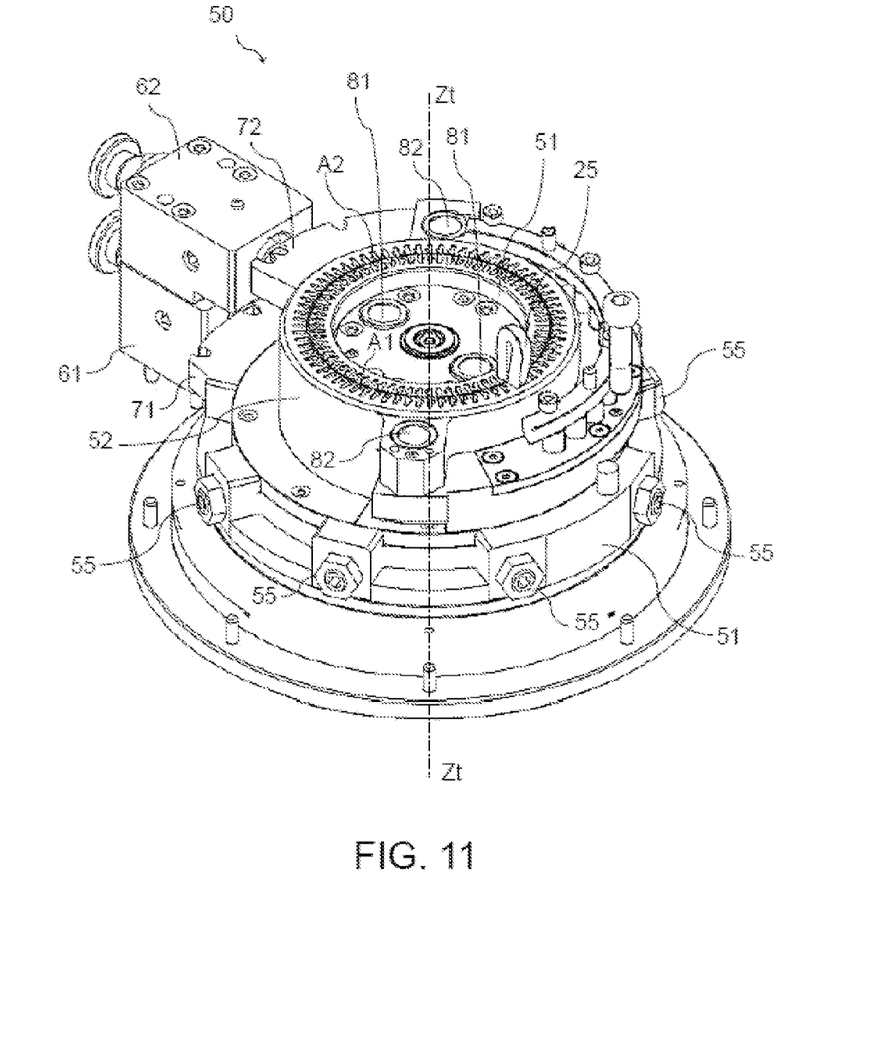
FIG. 11 shows a perspective view of a twisting device comprised in the twisting apparatus of FIG. 10.
Figure 12:
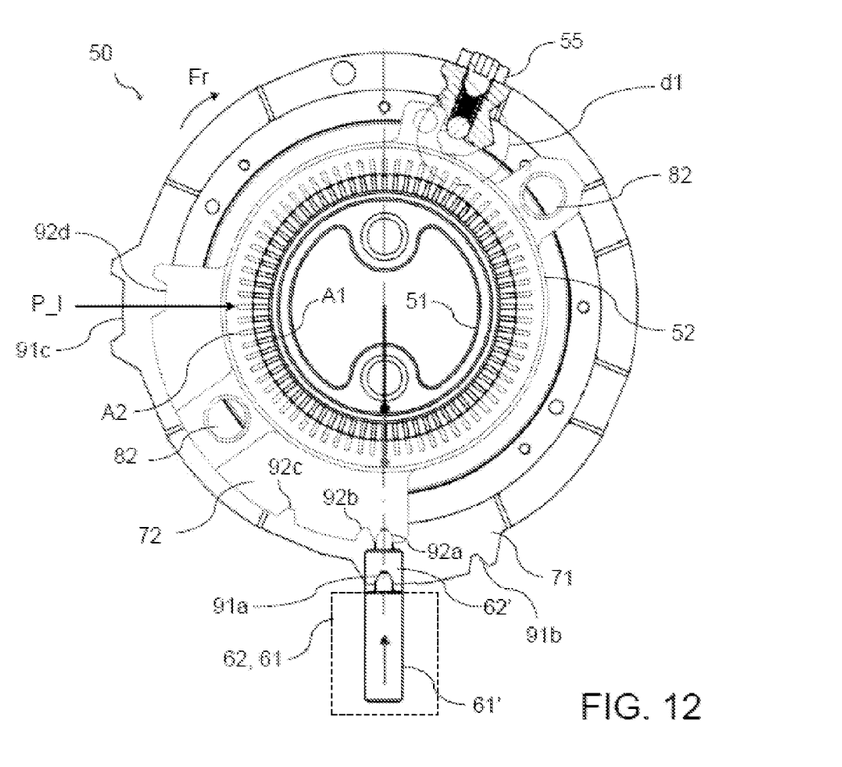
FIG. 12 shows a top view of the twisting device of FIG. 11 with some parts removed.
Figure 13:
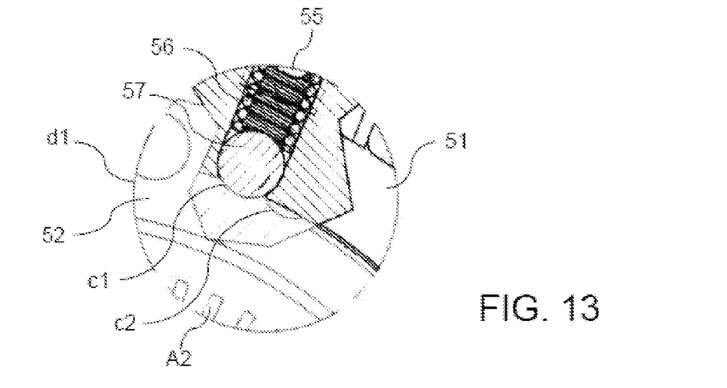
FIG. 13 shows an enlarged detail of FIG. 12.

In FIGS. 11, 12, 13, a twisting device embodiment 50 is represented. The twisting device 50 comprises at least a first 51 and a second body 52 coaxial with each other and extended around a twisting axis Zt-Zt, respectively comprising a first A1 and a second A2 circular array of pockets centered around such axis Zt-Zt. In the particular indicated embodiment, without introducing any limitation, each circular array A1, A2 comprises 72 pockets. It must be observed that in the case in which the slots of the stator have more than two insertion positions P1, P2, the twisting device 50 will comprise more than two pocket arrays.

The first and the second body 51, 52 are rotatable around the twisting axis Zt-Zt in order to assume at least one insertion configuration, or conductor loading configuration, in which respective pockets of the first and the second circular array A1, A2 are radially aligned with each other. By radial direction, it is intended a direction perpendicular to, and passing through, the twisting axis Zt-Zt. In the aforesaid insertion configuration, one or more U-shaped preformed conductors 25 can be inserted in a manner such that two legs 5 of the aforesaid U-shaped preformed conductors are inserted in a pair of adjacent pockets, respectively radially aligned of the first A1 and the second A2 circular array. An operative loading configuration of the twisting device 50 is for example represented in FIG. 12, in which with P_I a possible fixed loading position has been indicated.

The loading of the U-shaped preformed conductors 25 inside the twisting device 50 can, for example and without introducing any limitation, be attained in the loading station 31 by employing (for example) an insertion device as described in the U.S. Pat. No. 7,721,413 which is hereby incorporated by reference. The U-shaped preformed conductors 25 are, for example and without introducing any limitation, made by means of an apparatus and a method as described in the U.S. Pat. No. 7,480,987 which is hereby incorporated by reference. Possible variants of the aforesaid apparatus are described in the patent application No. PCT/IT2010/000160 and No. PCT/IT2010/000187, not yet published on the filing date of the present application and which are hereby incorporated by reference. Finally, in accordance with one non-limiting embodiment, the pockets of the twisting device 50 are made in accordance with the teachings of the patent application No. PCT/IT2010/000174 not yet published on the filing date of the present application and which is hereby incorporated by reference.

In accordance with one embodiment, the twisting device 50 comprises first locking elements 55 adapted to removably lock a relative rotation between the first 51 and the second 52 body and to allow, when activated (in other words, in a locking configuration), an integral rotation of the first 51 and the second 52 body with respect to an external reference and around the twisting axis Zt-Zt. In accordance with one embodiment, the aforesaid first locking elements comprise at least one spring clamp 55. For example, such spring clamp 55 is mainly housed in a seat made in one of said bodies 51, 52, in the embodiment in the body 51, and comprises a helical spring 56 and a locking body 57, which in the embodiment is represented by a sphere, which projects from such seat in order to be engaged in a locking seat $c_1$, $c_2$ provided in the other of said bodies 51, 52, in the embodiment in the second body 52. Preferably, each spring clamp 55 is associated with two adjacent locking seats $c_1$, $c_2$. In the embodiment represented in FIG. 13, the centers of such adjacent locking seats $c_1$, $c_2$ are angularly spaced from each other by 5°, i.e. by the angular distance between the centers of two adjacent pockets. It is observed that in the particular embodiment represented, the first locking elements 55 are automatic and normally activated.

With reference to FIG. 11, in accordance with one embodiment, the twisting device 50 comprises a plurality of the aforesaid first locking elements 55.

In accordance with one embodiment, the twisting device 50 comprises second locking elements 61, 62 adapted to lock, in an independent manner with respect to each other, the first 51 and/or the second body 52 with an external reference, e.g. the rotating table 36, in order to prevent a rotation of the bodies 51, 52 with respect to such reference. In the particular represented embodiment, the second locking elements 61, 62 comprise a first 61' and a second 62' punch, activatable/deactivatable in an independent manner with respect to each other by a respective control signal, in order to respectively assume an advanced position (as is represented, for example, in FIG. 12) and a moved-back position (as is for example represented in FIG. 14). For example, the aforesaid punches 61', 62' are commanded by, or are part of, pneumatic cylinders.

Figure 14:
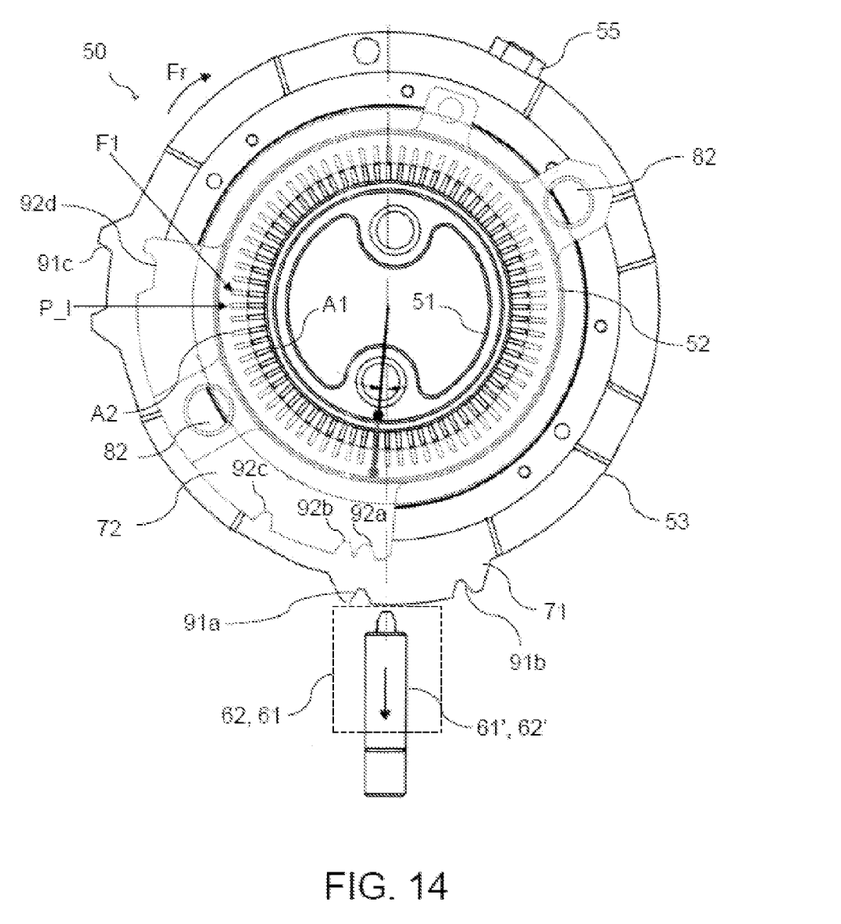
FIG. 14 shows a further top view of the twisting device of FIG. 11.

In the advanced position or locking position, the punches 61', 62' are adapted to be selectively engaged in a respective plurality of locking seats 91$a$, 91$b$, 91$c$ and 92$a$, 92$b$, 92$c$, 92$d$ provided for on an external wall 71, 72 respectively of the first 51 and second 52 body. The second locking elements 61, 62 are for example integral with the rotating table 36, so that it is understood that in the locking position (FIG. 12) the punches 61', 62' can lock the bodies 51, 52 to the rotating table 36, therefore preventing a rotation of said bodies 51, 52 with respect to an external reference. With reference to FIG. 14, it is observed that on the contrary, in the moved-back position or unlocked position, the punches 61', 62' do not prevent a rotation of the two bodies 51, 52 with respect to an external reference. In accordance with one embodiment, at least one of the aforesaid locking seats 91$a$, 91$b$, 91$c$ and 92$a$, 92$b$, 92$c$ is a seat with clearances, adapted to allow a rotation of the associated body 51, 52 for a predefined and limited angular travel with respect to an external reference, even when the respective punch 61', 62' is in advanced position. In the particular represented embodiment, two such locking seats with clearances 91$c$ and 92$d$ are provided for, associated with the first and the second body 51, 52, respectively.

In accordance with one embodiment, the second locking elements 61, 62 are adapted to lock one of the aforesaid bodies 51, 52 to a fixed reference in a manner such that, by driving in rotation the other of said bodies, such bodies can carry out a relative rotation with respect to each other, overcoming the opposing resistance of the first locking means 55. In other words, the second locking means 61, 62 prevail with respect the first locking elements 55.

Described below is an example of operation of a twisting apparatus and device, as described above.

Figure 15:
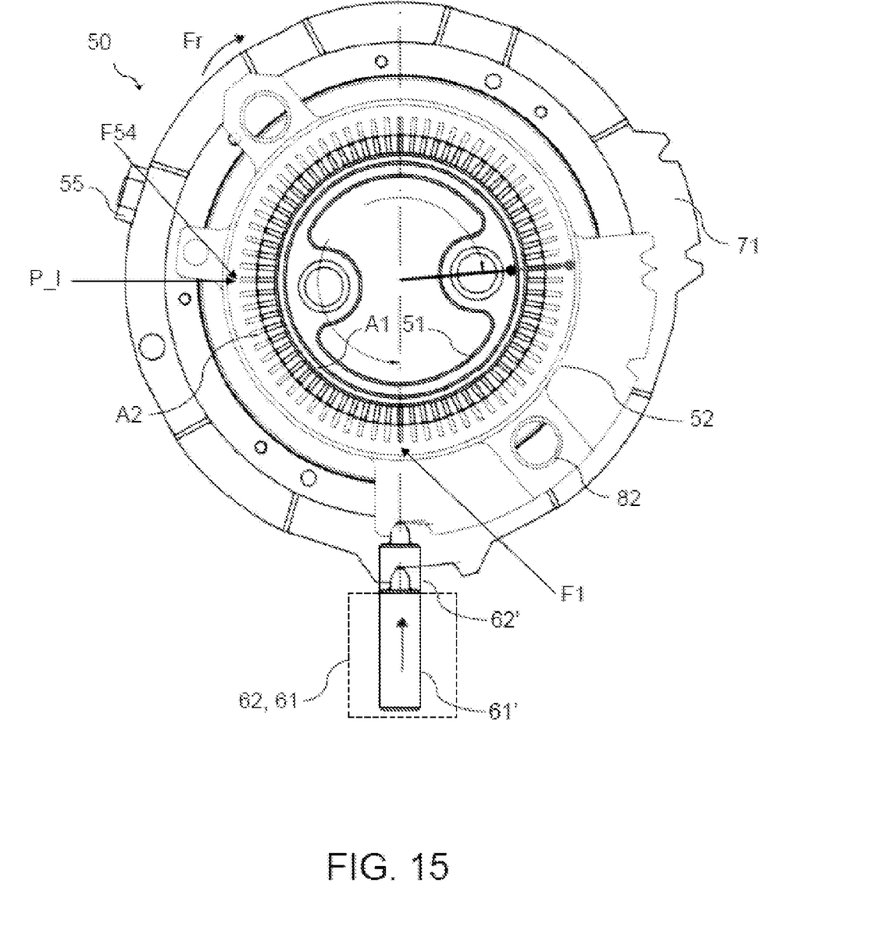
FIG. 15 shows a further top view of the twisting device of FIG. 11.

In FIG. 12, the twisting device 50 is represented in an operative insertion configuration. In such configuration, the twisting device 50 is positioned at the loading station 31. In such station 31, a stepper servo motor, or generally a rotational stepper drive device not shown in the figures, is coupled to the first body 51. In the aforesaid insertion configuration, the two bodies 51, 52 are locked to the rotating table 36, the two punches 61' and 62' being in the advanced position and engaged in respective locking seats 91$a$,92$a$. In this configuration, in which each pocket of the first body 51 is radially aligned with a respective pocket of the second body 52, the first U-shaped preformed conductor 25 is inserted, i.e. loaded, in the twisting device 50, in particular in the two radially aligned pockets arranged at the fixed insertion position P_I. Subsequently, the two punches 61', 62' are brought into the moved-back position and by means of the servo motor the first body 51 is rotated around the twisting axis Zt-Zt, in the direction of the arrow Fr (i.e. in clockwise sense in the figures). The second body 52 is also driven in rotation, since it is locked to the first body 51 by means of the clamps 55. In the represented embodiment, the rotation carried out has an amplitude of 5°. After such rotation, the twisting device 50 reaches the further insertion configuration of FIG. 14, in which for the sake of simplicity, the U-shaped preformed conductor 25 inserted in the pockets indicated by the arrow F1 is not represented. With the punches 61', 62' in moved-back position, one proceeds pitch after pitch in the above-described manner until fifty-four of the seventy-two slots are filled, therefore reaching the configuration of FIG. 15 in which the punches 61', 62' are brought into advanced position and are engaged in the locking seats with clearances 91$c$ and 92$d$. In such configuration, all of the pockets starting from the arrow F54 going in clockwise sense up to the arrow F1 were therefore loaded with respective U-shaped preformed conductors 25. It is hence possible in such position to identify a subset of pockets occupied by a respective leg 5 of a U-shaped preformed conductor 25 and a residual subset of free pockets. In the particular embodiment described up to now, the subset of occupied pockets and the subset of free pockets form two circumference arcs complementary to each other.

Figure 16:
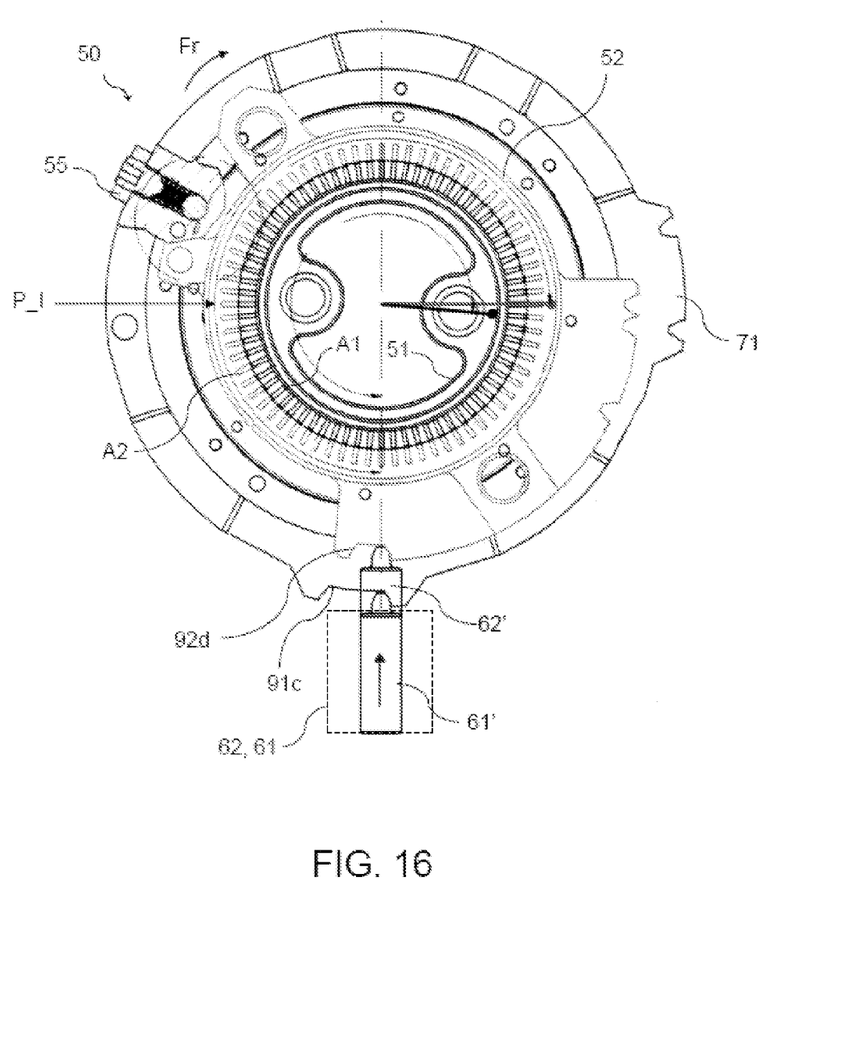
FIG. 16 shows a further top view of the twisting device of FIG. 11.
Figure 17:
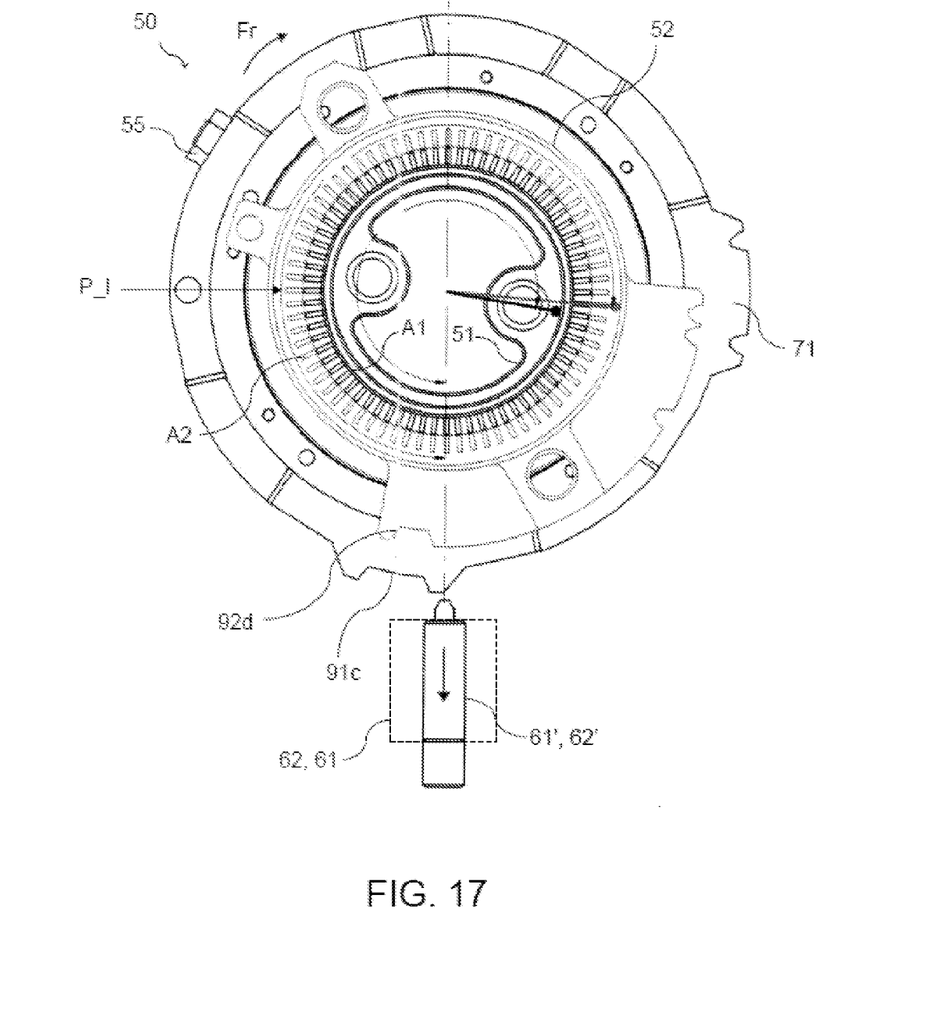
FIG. 17 shows a further top view if the twisting device of FIG. 11.

At this point, in accordance with one embodiment, the first body 51 is driven in rotation for two consecutive pitches: the first is provided for bringing two free, radially aligned pockets to the insertion position P_I, while the second is provided for making a twist, and in particular a spread, of the U-shaped preformed conductors 25 inserted in the twisting device 50. In particular, in the embodiment represented at the first pitch, both bodies 51, 52 rotate by 5°, while due to the width differences of the seats with clearances 91c, 92d, at the second pitch only the first body rotates, since the second body 52 is locked by the associated punch 62'. By means of the aforesaid relative rotation of one pitch between the two bodies 51, 52, the further insertion configuration of FIG. 16 is attained in which all the U-shaped preformed conductors 25 loaded in the twisting device 50 have undergone a twisting of 5°; in the represented embodiment, this corresponds to the angular distance between the centers of two adjacent pockets. With reference to FIGS. 13 and 16, it is observed that the relative rotation between the two bodies 51, 52 determines the passage of the sphere 57 from the locking seat c1 to the locking seat c2. Starting from the configuration of FIG. 16, the two punches 61', 62' are brought into moved-back position and—driving in rotation the first body 51 and thus the second body 52 at every pitch—the subset of free pockets are loaded with a plurality of U-shaped preformed conductors 25, leaving the pockets intended to receive the special conductors S1, S2, S3 free.

Figure 19:
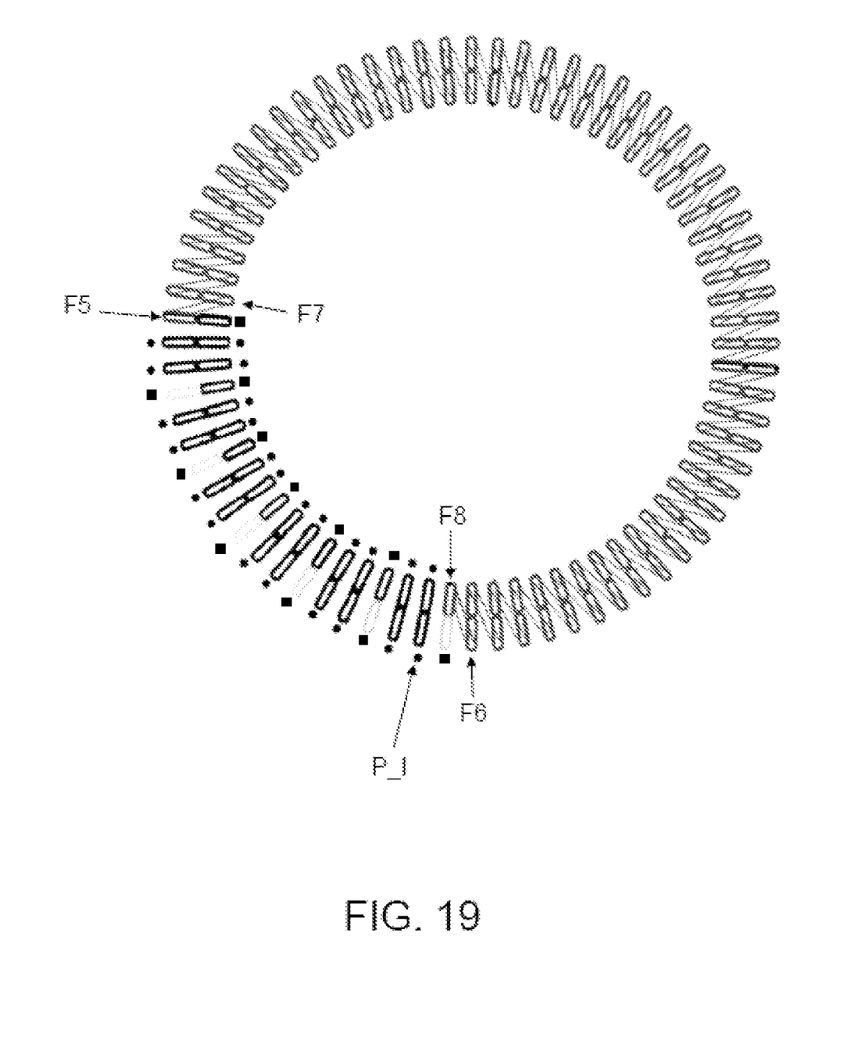
FIG. 19 shows an exemplifying diagram of a possible type of conductor loading in the twisting device of FIG. 11.

One possible exemplifying pattern for the filling of the pockets of the twisting device 50 is represented in FIG. 19. As can be appreciated, the external pockets are loaded with legs 5 which form a first continuous circumference arc (from the arrow F5 to the arrow F6 in clockwise direction). Also the inner pockets are loaded with legs 5 which form a second continuous circumference arc (from the arrow F7 to the arrow F8 in clockwise direction). All the pockets of the first and second arc house legs 5 of U-shaped preformed conductors 25 which in the embodiment were subjected to a twisting of 5°, or more generally to a twisting of a first predefined pitch. Such first pitch is not constrained to be equal to the angular distance between the centers of two adjacent pockets, but represents a design parameter.

The pockets marked by a square are instead intended to receive legs of special conductors S1, S2, S3 and are left free. The remaining pockets, marked by a circle, house legs 5 of U-shaped preformed conductors 25 (12 of which in the represented embodiment) not yet subjected to any twisting. In FIG. 19, the arrow P_I indicates the insertion position of the last U-shaped preformed conductor 25.

Figure 18:
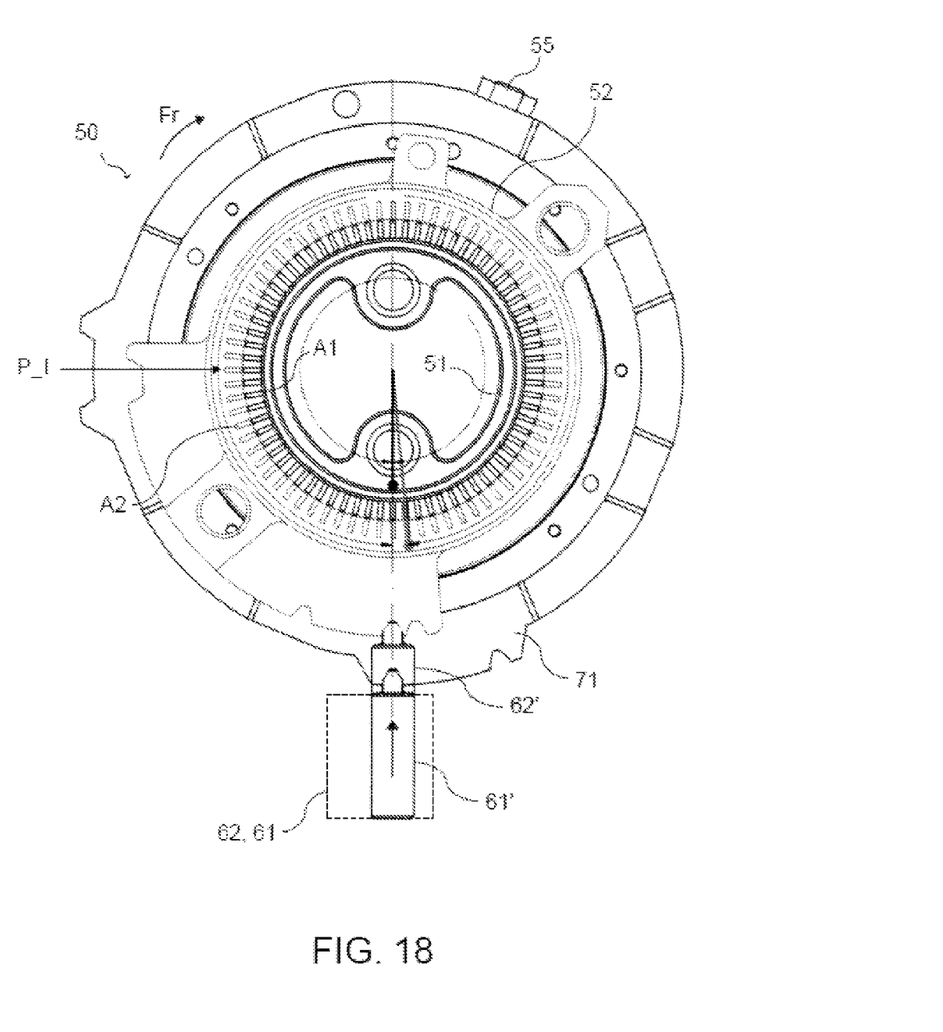
FIG. 18 shows a further top view of the twisting device of FIG. 11.

Returning to FIG. 18, after the filling of the pockets marked by the circle in FIG. 19, the position of the first and second 52 body is fixed by bringing the two punches 61', 62' into advanced position. At this point, by moving the rotating table 36, the twisting device 50 is brought into the station 32 for inserting the special conductors S1, S2, S3. In this station 32, the special conductors S1, S2, S3 are inserted, e.g. manually, into the pockets marked in FIG. 19 by the square. For example, the following are inserted: three terminals S1, three jumpers S2 and a neutral conductor S3. Subsequently, the twisting device 50 is brought into the twisting station 33, in which the punches 61', 62' are brought in moved-back position and in which a first servo motor and a second servo motor, not shown in the figures, are respectively coupled to the first body 51 and to the second body 52, e.g. by means of pins insertable in the respective seats 81 and 82. In accordance with one embodiment, the two bodies 51, 52 are driven in rotation in opposite directions by means of associated servo motors. Such driving in rotation is carried out according to a predefined twisting pitch (e.g. equal to eight slots), which shall be called second predefined twisting pitch in contrast to the first predefined twisting pitch mentioned above. In such a manner, one obtains a first plurality of basic conductors U1 having legs spaced from each other by a distance equal to the sum of said first and second predefined pitch and a second plurality of basic conductors U2 having legs spaced from each other by said second predefined pitch.

It is also observed that in the specific embodiment described with reference to FIG. 19, after the above-described twisting at the twisting station 33, it will be possible to obtain a set of bar conductors. Such bar conductors, after having been extracted from the twisting device 50 and inserted in the stator core slots 2, allow making a stator 1 comprising:

a stator core 2 comprising a cylindrical body in which a circular array of slots 8 is defined, each slot 8 comprising at least one first P1 and at least one second P2 insertion position, radially aligned with respect to each other;

at least one bar winding comprising a first plurality of basic conductors U1, U2 having two legs 5 and a connection portion 15 between said legs, the first plurality of basic conductors U1, U2 comprising at least one first set of conductors U1 having legs offset from each other by a first pitch and a second set U2 of conductors having legs offset from each other by a second pitch different from the first pitch; the bar winding also comprises a second plurality of special bar conductors S1, S2, S3 for the completion of the winding having one or more legs, the legs 5 of the conductors of the first and second plurality belonging to a first or a second circular array of legs, based on the occupied insertion position. The first and the second circular array each comprise:

a first arc of legs of the first set of conductors U1 delimited by a respective initial and final leg of said conductors U1 of the first set;

an arc complementary to said first arc in which legs are inserted of the second set of conductors U2 as well as legs of the special bar conductors S1, S2, S3.

Figure 20:
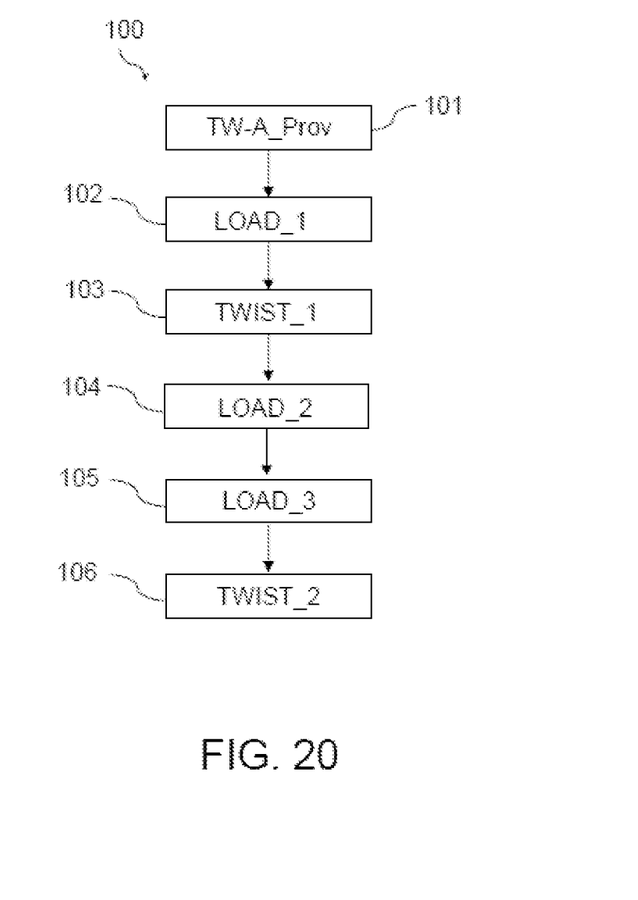
FIG. 20 shows a flow chart of a twisting method.

With reference to FIG. 20, based on the functioning illustrated above of the twisting device 20, it is observed that by generalizing such functioning, a method 100 was in practice described for twisting preformed conductors for bar windings of electric machines, said conductors comprising a first and a second leg 5 joined together by a connection portion 15, the method 100 comprising the steps of:

a) providing 101 ("TW-A_Prov" in FIG. 20) a twisting apparatus 30 comprising a twisting device 50 having at least a first 51 and a second 52 body coaxial with each other and extended around a twisting axis Zt-Zt, respectively comprising a first and a second circular array A1, A2 of pockets with center on such axis; said bodies 51, 52 are relatively rotatable with respect to each other around the twisting axis in order to assume a first insertion configuration, in which respective pockets of the first and second array are radially aligned with each other in pairs with respect to the twisting axis;

b) loading 102 ("LOAD_1", in FIG. 20), in a subset of said pockets, a first plurality of said conductors in a manner such that aligned pockets of the first and second array respectively receive a first and a second leg 5 of a respective conductor, the loading step 102 being such to leave a first residual subset of pockets free;

c) driving 103 ("TWIST_1", in FIG. 20) the first 51 and the second 52 body in relative rotation around said axis Zt-Zt, in order to distance such legs 5 from each other by a first pre-established twisting pitch, until a second insertion configuration is reached in which a second plurality of pockets of the first and second body and said residual subset are radially aligned with respect to each other.

The twisting method 100 also comprises, after the driving in rotation step 103, the steps of:

d) loading 104 ("LOAD_2", in FIG. 20), in a second subset of said second plurality of pockets, a second plurality of preformed conductors in a manner such that aligned pockets of the first and second array belonging to said second subset respectively receive a first and a second leg 5 of a respective preformed conductor;

e) driving 106 ("TWIST_2", in FIG. 20) the first and the second body in relative rotation around said axis Z-Z, in order to distance the legs 5 of a second plurality of conductors from each other by a second pre-established twisting pitch and to further distance the legs of the first plurality of conductors from each other by said second pre-established twisting pitch, therefore obtaining said first plurality of conductors having legs spaced from each other by a distance equal to the sum of said first and second pitch and said second plurality of conductors having legs spaced from each other by said second pitch.

In accordance with one possible embodiment, in the loading step 104, a second residual subset of pockets is left free, and the method also comprises a step 105 for loading ("LOAD_3", in FIG. 20) pockets of said second residual subset with a plurality of special preformed bar conductors S1, S2, S3 intended to complete a winding. In accordance with one embodiment, the step of loading 105 pockets with said second residual subset is carried out before executing said driving step 106.

In accordance with a particular embodiment, the aforesaid first pre-established pitch is equal to the angular distance between the centers of two adjacent pockets of a same array.

In accordance with a further embodiment, the loading steps 102 and 104 are carried out by inserting the legs of the conductors in the pockets in a fixed insertion position and making said first 51 and said second 52 body rotate, maintaining said bodies integral with each other during rotation. In particular, said rotation can be carried out by driving in rotation only one of said first or second body; the other of said bodies is locked to the driven body by the first removable locking means 55 adapted to prevent a relative rotation between said bodies 51, 52 but to allow a rotation of both bodies with respect to an external reference.

In accordance with one embodiment, the driving step 103 is carried out by driving in rotation one of said first and second bodies 51, 52, maintaining in a fixed angular position the other of said bodies by means of second locking elements 61, 62.

In accordance with one embodiment, in the loading step 102 a first arc of said pocket arrays is loaded, leaving free a second arc complementary to said first arc. In the embodiment described up to now, the first arc is wider than the second arc.

As can be appreciated from that described above, the above-illustrated twisting method and the apparatus allow meeting the requirements described above with reference to the prior art.

Indeed, it is observed that the aforesaid method allows carrying out, in an automated manner, a twisting with differential pitch; through this, it is possible to make windings for which the bending of the end portions 7 projecting from the welding face 4, after the insertion of the bar winding in the slots 8 of a stator core 2, can be carried out in a relatively simple and convenient manner. The same is valid for the welding of such bent end portions 7.

A man skilled in the art, in order to meet contingent and specific requirements, can make numerous changes and variations to the method and the apparatus described above, all contained in the scope of the invention as defined by the following claims.

The invention claimed is:

1. Method for twisting preformed bar conductors for bar windings of electric machines, said conductors comprising a first and a second leg joined together by a connection portion, the method comprising the steps of:

a) providing a twisting apparatus comprising a twisting device having at least a first and a second body coaxial with each other and extended around a twisting axis (Zt-Zt), and respectively comprising a first and a second circular array of pockets with center on such axis (Zt-Zt), said bodies being relatively rotatable with respect to each other around the twisting axis (Zt-Zt) in order to assume a first insertion configuration in which respective pockets of the first and second array are radially aligned with each other in pairs with respect to the twisting axis;

b) loading, in a subset of said pockets, a plurality of said preformed conductors in a manner such that aligned pockets of the first and second array respectively receive a first and a second leg of a respective conductor, the loading step being such to leave a first residual subset of pockets free;

c) driving the first and the second body in relative rotation around said axis (Zt-Zt), in order to distance the legs of the first plurality of conductors from each other by a first pre-established twisting pitch, until a second insertion configuration is reached in which a second plurality of pockets of said residual subset of pockets of the first and second body are radially aligned with each other;

wherein the method also comprises, after the step c), the steps of:

d) loading, in a second subset of said plurality of pockets, a second plurality of preformed conductors in a manner such that aligned pockets of the first and second array belonging to said second subset respectively receive a first and a second leg of a respective conductor;

e) driving the first and the second body in relative rotation around said axis, in order to distance the legs of the conductors of the second plurality of conductors from each other by a second pre-established twisting pitch and to further distance the legs of the first plurality of conductors from each other by said second pre-established twisting pitch, therefore obtaining said first plurality of conductors having legs spaced from each other by a distance equal to the sum of said first and second pitch and said second plurality of conductors having legs spaced from each other by said second pitch.

2. Twisting method according to claim 1, wherein during the loading step b), a second residual subset of pockets are left free, and wherein the method also comprises a further step for loading pockets of said second residual subset with a plurality of special preformed bar conductors provided for the completion of a winding.

3. Twisting method according to claim 2, wherein said step of loading pockets of said second residual subset is carried out before executing said driving step e).

4. Twisting method according to claim 1, wherein said first pre-established pitch is equal to the angular distance between the centers of two adjacent pockets of a same array.

5. Twisting method according to claim 1, wherein the loading steps are carried out by inserting the legs of the conductors in the pockets in a fixed insertion position and making said first and said second body rotate, maintaining said bodies integral with each other in rotation.

6. Twisting method according to claim 5, wherein said rotation is carried out by driving in rotation only one of said first or second body, the other of said bodies being locked to the driven body by first removable locking elements adapted to prevent a relative rotation between said bodies but to allow an integral rotation of both the bodies with respect to an external reference.

7. Twisting method according to claim 1, wherein said driving step c) is carried out by driving in rotation one of said first and second bodies, maintaining in a fixed angular position the other of said bodies by selectively activating second locking elements.

8. Twisting method according to claim 1, wherein in the loading step b), a first arc of said pocket arrays is loaded, leaving free a second arc complementary to said first arc.

9. Twisting method according to claim 8, wherein said first arc is wider than said second arc.

* * * * *